(12) United States Patent
Wynn et al.

(10) Patent No.: US 8,191,124 B2
(45) Date of Patent: May 29, 2012

(54) SYSTEMS AND METHODS FOR ACQUIRING NETWORK CREDENTIALS

(75) Inventors: Simon Wynn, Redwood City, CA (US); John Gordon, Alameda, CA (US)

(73) Assignee: Devicescape Software, Inc., San Bruno, CA (US)

( * ) Notice: Subject to any disclaimer, the term of this patent is extended or adjusted under 35 U.S.C. 154(b) by 502 days.

(21) Appl. No.: 11/899,697

(22) Filed: Sep. 6, 2007

(65) Prior Publication Data

US 2008/0060066 A1 Mar. 6, 2008

Related U.S. Application Data

(60) Provisional application No. 60/824,756, filed on Sep. 6, 2006.

(51) Int. Cl.
*G06F 21/00* (2006.01)
(52) U.S. Cl. .............................. 726/6; 713/186; 726/27
(58) Field of Classification Search .................. 726/5, 6, 726/27; 713/186
See application file for complete search history.

(56) References Cited

U.S. PATENT DOCUMENTS

| | | | |
|---|---|---|---|
| 6,151,628 A | 11/2000 | Xu et al. | |
| 6,161,185 A | 12/2000 | Guthrie et al. | |
| 6,233,577 B1 | 5/2001 | Ramasubramani et al. | |
| 6,799,038 B2 | 9/2004 | Gopikanth | |
| 6,871,284 B2 | 3/2005 | Cooper et al. | |
| 6,961,857 B1 | 11/2005 | Floryanzia | |
| 7,360,087 B2 | 4/2008 | Jorgensen et al. | |
| 7,409,543 B1 | 8/2008 | Bjorn | |
| 7,437,755 B2 | 10/2008 | Farino et al. | |
| 7,457,950 B1 | 11/2008 | Brickell et al. | |
| 7,469,139 B2 | 12/2008 | van de Groenendaal | |
| 7,685,264 B2 | 3/2010 | Tumsi Dayakar et al. | |
| 7,920,531 B2 | 4/2011 | Gupta et al. | |
| 2001/0034837 A1 | 10/2001 | Kausik et al. | |
| 2002/0194501 A1 | 12/2002 | Wenocur et al. | |
| 2002/0199096 A1 | 12/2002 | Wenocur et al. | |
| 2003/0004994 A1 | 1/2003 | Kamrowski et al. | |
| 2003/0097592 A1 | 5/2003 | Adusumilli | |
| 2003/0188201 A1 | 10/2003 | Venkataramappa | |
| 2003/0204748 A1 | 10/2003 | Chiu | |
| 2003/0217137 A1 | 11/2003 | Roese et al. | |
| 2004/0003060 A1 | 1/2004 | Asoh et al. | |
| 2004/0003081 A1 | 1/2004 | Justus | |

(Continued)

FOREIGN PATENT DOCUMENTS

WO  WO 2005096160 A1 * 10/2005

OTHER PUBLICATIONS

Holtmanns et al., U.S. Appl. No. 60/818,517, filed Jul. 6, 2006, referenced in US 2008/0016230.*

(Continued)

*Primary Examiner* — Hadi Armouche
(74) *Attorney, Agent, or Firm* — Sheppard, Mullin, Richter & Hampton LLP

(57) ABSTRACT

Exemplary methods and systems for acquiring network credentials for network access are described. The exemplary method includes receiving network configuration information from a network device on a communication network, generating a credential request, transmitting the credential request to a credential server over a standard protocol of the network device, receiving the credential request response, and providing a network credential from the credential request response to the network device to access the communication network.

19 Claims, 7 Drawing Sheets

U.S. PATENT DOCUMENTS

| | | |
|---|---|---|
| 2004/0031058 A1 | 2/2004 | Reisman |
| 2004/0162818 A1 | 8/2004 | Shaw |
| 2004/0168090 A1 | 8/2004 | Chawla et al. |
| 2005/0066033 A1 | 3/2005 | Cheston et al. |
| 2005/0097051 A1 | 5/2005 | Madill, Jr. et al. |
| 2005/0144237 A1 | 6/2005 | Heredia et al. |
| 2005/0177750 A1 | 8/2005 | Gasparini et al. |
| 2005/0246431 A1 | 11/2005 | Spitaels |
| 2005/0260973 A1 | 11/2005 | Van de Groenendaal |
| 2006/0026289 A1 | 2/2006 | Lyndersay et al. |
| 2006/0048213 A1 | 3/2006 | Cheng et al. |
| 2006/0048214 A1 | 3/2006 | Pennington et al. |
| 2006/0130140 A1 | 6/2006 | Andreev et al. |
| 2006/0221919 A1 | 10/2006 | McRae et al. |
| 2007/0011725 A1 | 1/2007 | Sahay et al. |
| 2007/0019670 A1 | 1/2007 | Falardeau |
| 2007/0054654 A1* | 3/2007 | Jones ............................ 455/406 |
| 2007/0073817 A1 | 3/2007 | Gorty |
| 2007/0076612 A1 | 4/2007 | Iyer et al. |
| 2007/0091861 A1 | 4/2007 | Gupta et al. |
| 2007/0127423 A1 | 6/2007 | Ho |
| 2007/0209065 A1 | 9/2007 | Branam et al. |
| 2007/0256122 A1 | 11/2007 | Foo et al. |
| 2007/0270129 A1* | 11/2007 | Luo ............................ 455/414.1 |
| 2008/0016230 A1* | 1/2008 | Holtmanns et al. ............ 709/229 |
| 2008/0060065 A1 | 3/2008 | Wynn et al. |
| 2008/0225749 A1 | 9/2008 | Peng et al. |
| 2009/0031125 A1 | 1/2009 | Bjorn |
| 2009/0147792 A1* | 6/2009 | Anschutz et al. ......... 370/395.21 |
| 2009/0222537 A1 | 9/2009 | Watkins et al. |

OTHER PUBLICATIONS

Zündt et al. "Seamless Handoff in Community Based and Location Aware Heterogeneous Wireless Networks" 8th International Workshop on Mobile Multimedia Conference, Oct. 5-8, 2003, pp. 1-5, XP002281321.*

PCT International Search Report and Written Opinion dated Jul. 18, 2008, for International Application No. PCT/US07/19464.

PCT International Search Report and Written Opinion dated Jun. 12, 2008, for International Application No. PCT/US07/19462.

PCT International Search Report and Written Opinion dated May 21, 2008, for International Application No. PCT/US07/19463.

PCT International Search Report and Written Opinion dated Dec. 3, 2008, for International Application No. PCT/US08/78191.

PCT International Search Report and Written Opinion dated Dec. 8, 2008, for International Application No. PCT/US08/78198.

PCT International Search Report and Written Opinion dated Nov. 20, 2009 for International Application No. PCT/US2009/060532, 8 pages.

PCT International Search Report and Written Opinion dated Mar. 2, 2010 for International Application No. PCT/US2010/021409, 9 pages.

Office Action mailed Jul. 22, 2010 from U.S. Appl. No. 12/240,920, filed Sep. 29, 2008.

Office Action mailed May 30, 2008 from U.S. Appl. No. 11/899,739, filed Sep. 6, 2007.

Office Action mailed Aug. 25, 2009 from U.S. Appl. No. 11/899,739, filed Sep. 6, 2007.

Office Action mailed May 17, 2010 from U.S. Appl. No. 11/899,739, filed Sep. 6, 2007.

Office Action mailed Sep. 1, 2010 from U.S. Appl. No. 11/899,638, filed Sep. 6, 2007.

Office Action mailed Mar. 23, 2011 from U.S. Appl. No. 12/240,920, filed Sep. 29, 2008.

Office Action mailed Dec. 23, 2008 from U.S. Appl. No. 11/899,739, filed Sep. 6, 2008.

Office Action mailed Apr. 6, 2011 from U.S. Appl. No. 11/899,739, filed Sep. 6, 2007.

Notice of Allowance mailed Oct. 31, 2011 from U.S. Appl. No. 11/899,739, filed Sep. 6, 2007.

Office Action mailed May 4, 2011 from U.S. Appl. No. 11/899,638, filed Sep. 6, 2007.

Office Action mailed May 9, 2011 from U.S. Appl. No. 12/240,969, filed Sep. 29, 2008.

Notice of Allowance mailed Nov. 10, 2011 from U.S. Appl. No. 12/240,969, filed Sep. 29, 2008.

Search Report mailed Feb. 10, 2011 from European Serial Number 07837822.1 filed Sep. 6, 2007.

Search Report mailed Apr. 4, 2011 from European Serial No. 08833721.7 filed Sep. 29, 2008.

Search Report mailed Apr. 1, 2011 from European Serial No. 08834360.3 filed Sep. 29, 2008.

Search Report mailed Feb. 10, 2011 from European Serial No. 07837824.7 filed Sep. 6, 2007.

Search Report mailed Feb. 10, 2011 from European Serial No. 07837823.9 filed Sep. 6, 2007.

* cited by examiner

SYSTEMS AND METHODS FOR ACQUIRING NETWORK CREDENTIALS

CROSS-REFERENCE TO RELATED APPLICATIONS

The present application claims benefit of U.S. Provisional Patent Application No. 60/824,756 filed Sep. 6, 2006, and entitled "Network Credential Discovery Using DNS," which is hereby incorporated by reference. The present application is also related to U.S. patent application Ser. No. 11/899,638, entitled "Systems and Methods for Obtaining Network Access," filed Sep. 6, 2007, and U.S. patent application Ser. No. 11/899,739, entitled "System and Method for Providing Network Credentials," filed Sep. 6, 2007, both of which are incorporated by reference.

BACKGROUND

1. Field of the Invention

The present invention generally relates to accessing communication networks. More particularly, the invention relates to the automatic access of wireless communication networks.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology. Various cellular (e.g. GSM, CDMA and the like), Wi-Fi (i.e. IEEE 802.11), WiMAX (i.e. IEEE 802.16), and other technologies have enabled a wide range of access options for a potential network user. Many wireless access points or "hotspots" are accessible only with local geographic regions—in some cases as small as a specific business or other address. In addition, strategically placed hotspots may provide public or private network access for a diverse group of people.

The owners or managers of hotspots often require password and the like to enable user access. As a result, a user of multiple hotspots may have to store, remember, or otherwise manage a large number of passwords. Many users may store their passwords on a laptop computer they use to access the hotspot. However, not all devices capable of accessing hotspots are laptop computers; cellular phones, personal digital assistants (PDAs), and many other devices are now capable of wireless access. Unfortunately, users often cannot easily enter the password on the device or store the password within the device. For example, some devices capable of wireless access may not have a keyboard. Even when a device includes a keyboard, the keyboard is often small and may be of limited functionality, especially for users with limited finger dexterity.

When users store passwords on a laptop computer, the user must first access the laptop computer and store the correct password within the computer. When a password changes, the user is required to update the password within the computer. Additionally, having the username and password stored in the device presents a security problem should the device be lost or stolen.

Further, users are typically required to enter a password, username, and navigate a website to obtain network access. This process is time consuming and the user may enter the wrong information and be forced to re-enter data.

When users enter a password manually, they are less apt to remember difficult passwords. As a result, simple password access and un-encrypted access is susceptible to hacking and may compromise the user's network access, the hotspot, and/or the user's personal information. Moreover, the user's network access may be stolen if the user's simple password is hacked or simply guessed.

SUMMARY OF THE INVENTION

Exemplary methods and systems for acquiring network credentials for network access are described. The exemplary method comprises receiving network configuration information from a network device on a communication network, generating a credential request, transmitting the credential request to a credential server over a standard protocol of the network device, receiving the credential request response, and providing a network credential from the credential request response to the network device to access the communication network.

The method may further comprise encrypting the credential request, decrypting the credential request response, and digitally signing the credential request. The standard protocol may be DNS over user datagram protocol (UDP). Further, the credential request may comprise a location identifier that may be based on at least some of the network configuration information and a digital device identifier (DDID).

The credential request response may comprise a command to not cache the credential request response. Providing the credential from the credential request response may comprise analyzing a network access page and posting form information within the network access page.

An exemplary system for acquiring network credentials may comprise a network module, a credential request module, a credential engine, and a network access engine. The network module may be configured to receive network configuration information from a network device on a communication network and transmit a credential request to a credential server over a standard protocol of the network device. The credential request module may be configured to generate the credential request. The credential engine may be configured to receive a credential request response. The network access engine may be configured to provide a network credential from the credential request response to the network device to access the communication network.

An exemplary computer readable medium may have embodied thereon a program. The program may be executable by a processor for performing a method for acquiring network credentials. The method may comprise receiving network configuration information from a network device on a communication network, generating a credential request, transmitting the credential request to a credential server over a standard protocol of the network device, receiving the credential request response, and providing a network credential from the credential request response to the network device to access the communication network.

DETAILED DESCRIPTION OF THE INVENTION

Embodiments of the present invention provide systems and methods for acquiring network credentials. In exemplary embodiments, a digital device is associated with a user. An access controller (e.g., associated with a hotspot access point) requires the digital device to authenticate or otherwise provide network credentials (e.g., a username and password) in order to use the hotspot and access a communication network. After negotiating a connection between the digital device and a network device but before credentials are provided, the digital device may transmit a credential request using a standard protocol to the network device. A credential server receives the credential request and identifies the correct credentials to access the communication network. The credential server may transmit the network credentials with a credential request response back to the digital device which then provides the network credentials to obtain access to the communication network. In one embodiment, the communication network comprises the Internet.

Figure 1:
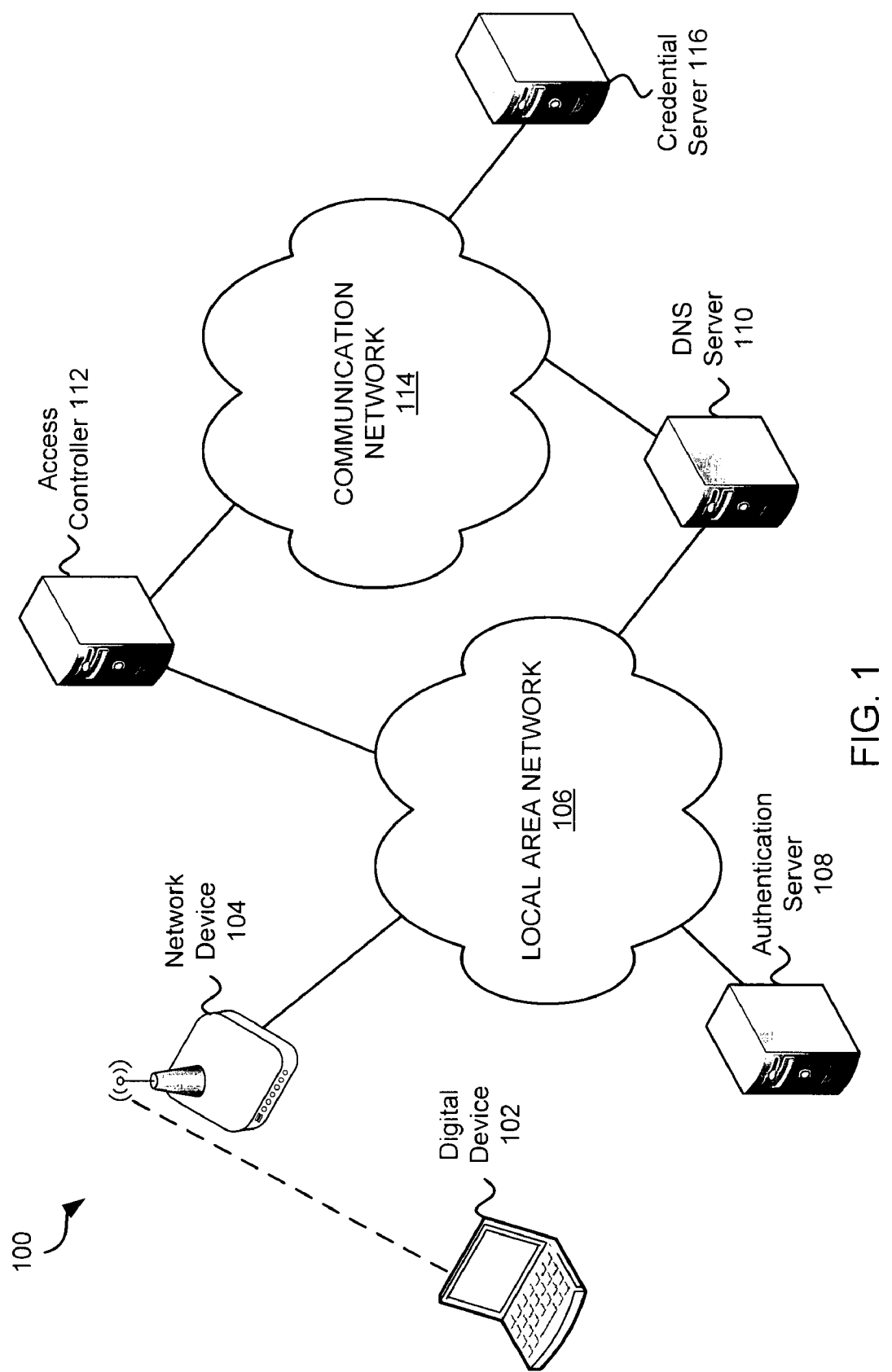
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access to communicate over the communication network 114. The network credentials may comprise a username, password, and login procedure information. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

More details regarding the process for determining and providing the network credentials at the credential server 116 are provided in co-pending U.S. patent application Ser. No. 11/899,739, entitled "System and Method for Providing Network Credentials" filed Sep. 6, 2007, incorporated by reference herein. Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password and/or login procedure information. The login procedural information may comprise, for example, HTML form element names, submission URL, or submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server. More details regarding the process for obtaining network access are provided in co-pending U.S. patent application Ser. No. 11/899,638, entitled "System and Method for Obtaining Network Access," filed Sep. 6, 2007, and incorporated by reference herein.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
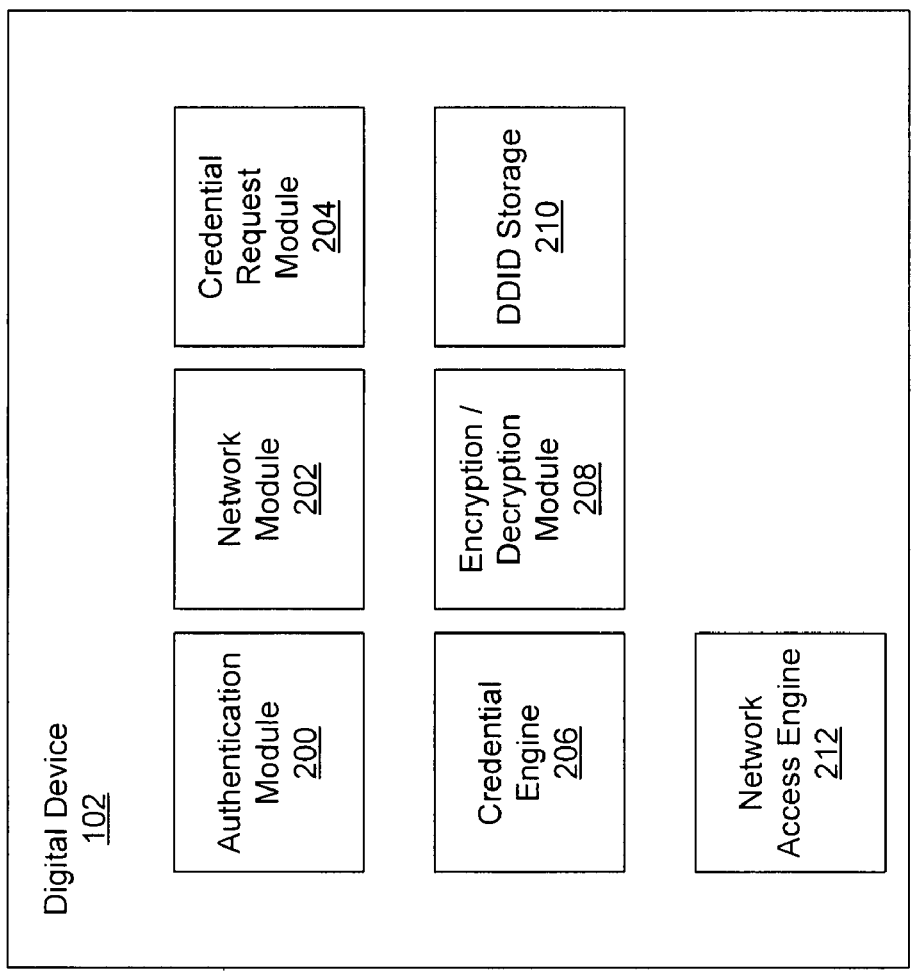
FIG. 2 is a block diagram of an exemplary digital device.

FIG. 2 is a block diagram of an exemplary digital device. The digital device 102 comprises an authentication module 200, a network module 202, a credential request module 204, a credential engine 206, an encryption/decryption module 208, a DDID (digital data interface Device) storage 210, and a network access engine 212. A module may comprise, individually or in combination, software, hardware, firmware, or circuitry.

The authentication module 200 may be configured to provide security to the credential request, authenticate the credential request response, and establish secure communication between the digital device 102 and the authentication server 108. In various embodiments, the authentication module 200 provides security to the credential request by digitally signing the credential request. In one example, the credential request is signed using an encryption key shared with the credential server 116.

The authentication module 200 may authenticate the credential request response received from the credential server 116 by decrypting the credential request response with an encryption key (e.g., the shared encryption key). In some embodiments, the encryption/decryption module 208 decrypts the credential request response.

In various embodiments, the authentication module 200 may also generate a random value (i.e., a nonce value) and include the value within the credential request. When the credential request response is received, a nonce may be retrieved from the credential request response and compared to the random value included within the credential request to further authenticate the credential request response.

The network module 202 may be configured to perform operations in order to access the communication network 114. In some embodiments, the network module 202 may receive and transmit communications associated with accessing the hotspot. In one example, the network module 202 negotiates the initial connection over the digital device 102 and the network device 104.

In some embodiments, the network module 202 may perform a search for the communication network 114. For example, when the digital device 102 enters the hotspot, the network module 214 may try to connect with the communication network 114. If the digital device 102 is unable to access the communication network 114, embodiments of the present invention described herein may be practiced.

The credential request module 204 may generate and transmit the credential request. The credential request may be a standard protocol. In one example, the credential request is a UDP protocol.

In various embodiments, the credential request module 204 retrieves the network device identifier from the network device 104. In one example, the network device identifier is the service set identifier (SSID) of the network device. The network device identifier may then be included in the credential request. Alternately, the credential request module 204 may identify the service provider from a network access page provided by the network device 104. The credential request module 204 may then provide the service provider identifier within the credential request.

A network access page may comprise a web page or information (e.g., XML tags) received from the authentication server 108. In response to the network access page, the digital device 102 may provide information (e.g., network credentials or responses) to the authentication server 108 to obtain network access. In one example, the network access page comprises several web pages which are received by the digital device 102 from the authentication server 108 and/or the network device 104. In another example, the network access page comprises one or more tags or a combination of web pages and tags.

The credential request module 204 may also include a digital device identifier (DDID) and/or user identifier within the credential request. In various embodiments, the DDID may comprise a MAC address, a unique identifier, or any other identifier that identifies the digital device 102. The user identifier can be any identifier that identifies the owner or user (e.g., a username or passcode) of the digital device 102.

The exemplary credential engine 206 may receive the credential request response and retrieve the network credentials. In some embodiments, the credential request response is decrypted by the encryption/decryption module 208 and the nonce authenticated by the authentication module 200.

As discussed, the retrieved network credentials may comprise login procedural information. In one example, the credentials include a username and password which are provided within a form retrieved from the authentication server 108. In some embodiments, the login procedural information may instruct the credential engine 206 to populate specific fields within the form with the correct credentials before submitting the completed form to the authentication server 108. Those skilled in the art will appreciate that there are many ways to provide credentials to the authentication server 108. The process of providing the credentials to the authentication server is further discussed in co-pending U.S. patent application Ser. No. 11/899,638, entitled "Systems and Methods for Obtaining Network Access," filed Sep. 6, 2007.

The encryption/decryption module 208 is configured to encrypt or decrypt communications sent/received by the digital device 102. In some embodiments, the credential request response may be encrypted by the credential server 116. In these embodiments, the encryption/decryption module 208 will decrypt the credential request response. In various embodiments, the encryption/decryption module 208 may establish secure communication between the digital device 102 and the authentication server 108. In one example, the encryption/decryption module 208 may establish a secure communication via SSL and https between the digital device 102 and the authentication server 108. It should be noted that, in accordance with some embodiments, the encryption/decryption module 208 may be optional.

The DDID storage 210 stores the DDID. The DDID may be retrieved from the DDID storage 210 by the credential request module 204 when the credential request is generated. The DDID storage 210 may be optional (e.g., when the DDID is the MAC address of the digital device 102). The DDID storage 210 may also comprise a user identifier that identifies the owner or user of the digital device 102 or the owner of an account associated with the credential server 116. In some embodiments, the user identifier comprises an identifier of the user associated with an account on the credential server 116.

The exemplary network access engine 212 may be configured to receive an authentication request and provide an authentication response to the network device 104 comprising the network credential.

Figure 3:
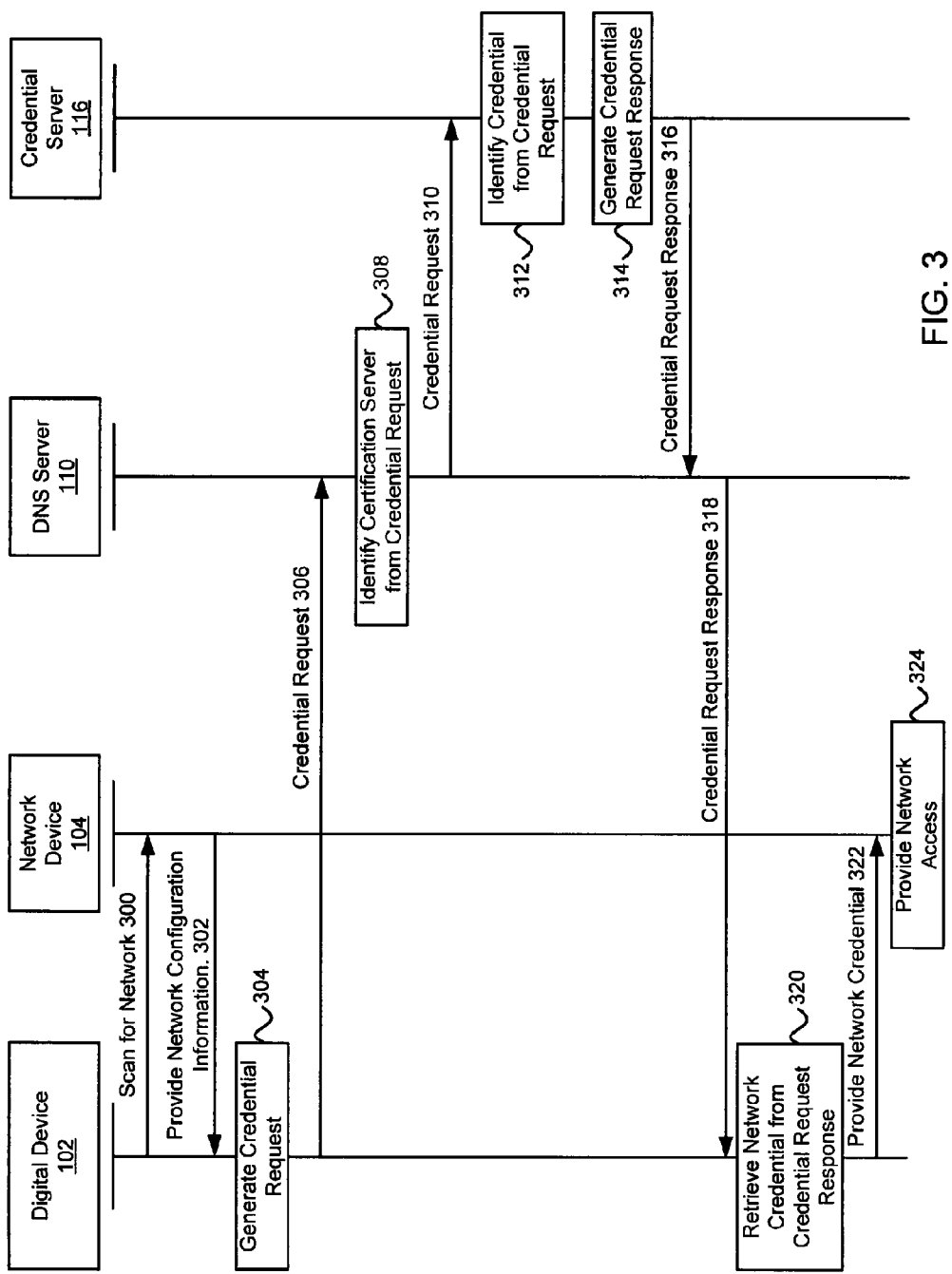
FIG. 3 is a flow diagram of an exemplary process for providing network access to the digital device.

FIG. 3 is a flow diagram of an exemplary process for providing network access to the digital device 102. When the digital device 102 first enters into a hotspot, the digital device 102 (e.g., network module 214) may scan for the local area network 106 in step 300. As a result of the scan, the network device 104 may provide network configuration information in step 302. The network configuration information may comprise one or more IP addresses for access to the DNS server 110.

In step 304, a credential request is generated by the digital device 102. As discussed above in connection with FIG. 2, the credential request module 240 may generate the credential request. Subsequently, the credential request may be sent to the DNS server 110 in step 306 using one of the IP addresses previously received from the network device 104.

Based on the credential request, the credential server 116 is identified by the DNS server 110 in step 308. The DNS server 110 forwards the credential request to the credential server 116. When the DNS server 110 is unable to locally resolve the DNS request, the credential request is forwarded to another DNS server on the communication network 114 which may then forward the credential request to the credential server 116. The credential request is forwarded, either directly or indirectly through one or more other DNS servers on the communication network 114, to the credential server 116 in step 310.

The credential server 116 identifies the network credential needed based on the credential request in step 312. For example, the credential request may comprise an identifier (i.e., the DDID) for the digital device 102 as well as an identifier for the hotspot (e.g., the service provider such as an operator). The identifiers may be compared against a table of such identifiers at the credential server 116 to determine the proper network credential. A credential request response is then generated in step 314 and relayed back to the DNS server 110 in step 316. The DNS server 110 forwards the credential request response back to the digital device in step 318.

The digital device 102 may then retrieve the network credentials from the credential request response in step 320. In exemplary embodiments, the retrieval module 224 will analyze the credential request response to retrieve the network credential embedded therein.

The network credential may then be provided to the network device 104 in step 322. An exemplary method for providing the network credentials to the network device (and subsequently to the authentication server 108) is discussed co-pending U.S. patent application Ser. No. 11/899,638, entitled "Systems and Methods for Obtaining Network Access," filed Sep. 6, 2007. Upon verifying the network credentials, the network device 104 provides network access to the digital device 102 in step 324.

Figure 4:
FIG. 4 is a block diagram of an exemplary credential request.

Referring now to FIG. 4, an exemplary credential request 400 is shown in more detail. According to exemplary embodiments, the request module 220 may generate the credential request 400. In one embodiment, the credential request 400 may be a DNS string having a structure that comprises a location identifier 402, a sequence identifier 404, a signature 406, the DDID 408, a service set identifier (SSID) 410, and a version identifier 412.

The optional location identifier 402 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 404 may comprise any number or set of numbers used to correspond to a subsequent request to the credential server 116 to determine if the login is successful. That is, the sequence identifier 404 provides a correlation mechanism by which verification of the login process may be made by the credential server 116.

In exemplary embodiments, the signature 406 comprises a cryptographic signature that is utilized to prevent spoofing. The signature 406 of the request from digital device 102 is verified by the credential server 116. If the signature 406 is not valid, then the request is rejected by the credential server 116.

The DDID 408 comprises a unique identifier of the digital device 102. For example, the DDID 408 may comprise a MAC address or any other universally unique identifier of the digital device 102. In exemplary embodiments, the DDID is retrieved from the DDID storage 210.

The SSID 410 comprises an identifier of the network access point or Wi-Fi service provider. For example, the SSID 410 may comprise the name of the service provider or the name of the venue operating the network device 104.

The version identifier 412 may identify the protocol or format of the credential request 400. For example, a digital device 102 may generate the credential request 400 and organize the data in a number of different formats. Each different format may be associated with a different version identifier. In some embodiments, the components of the credential engine 206 and the network access engine 212 may be updated, reconfigured, or altered over time, which may affect the structure of the credential request 400. As a result, the credential server 116 may receive a plurality of credential requests 400 which are formatted differently. The credential server 116 may access the required information from each credential request based on the respective version identifier.

Figure 5:
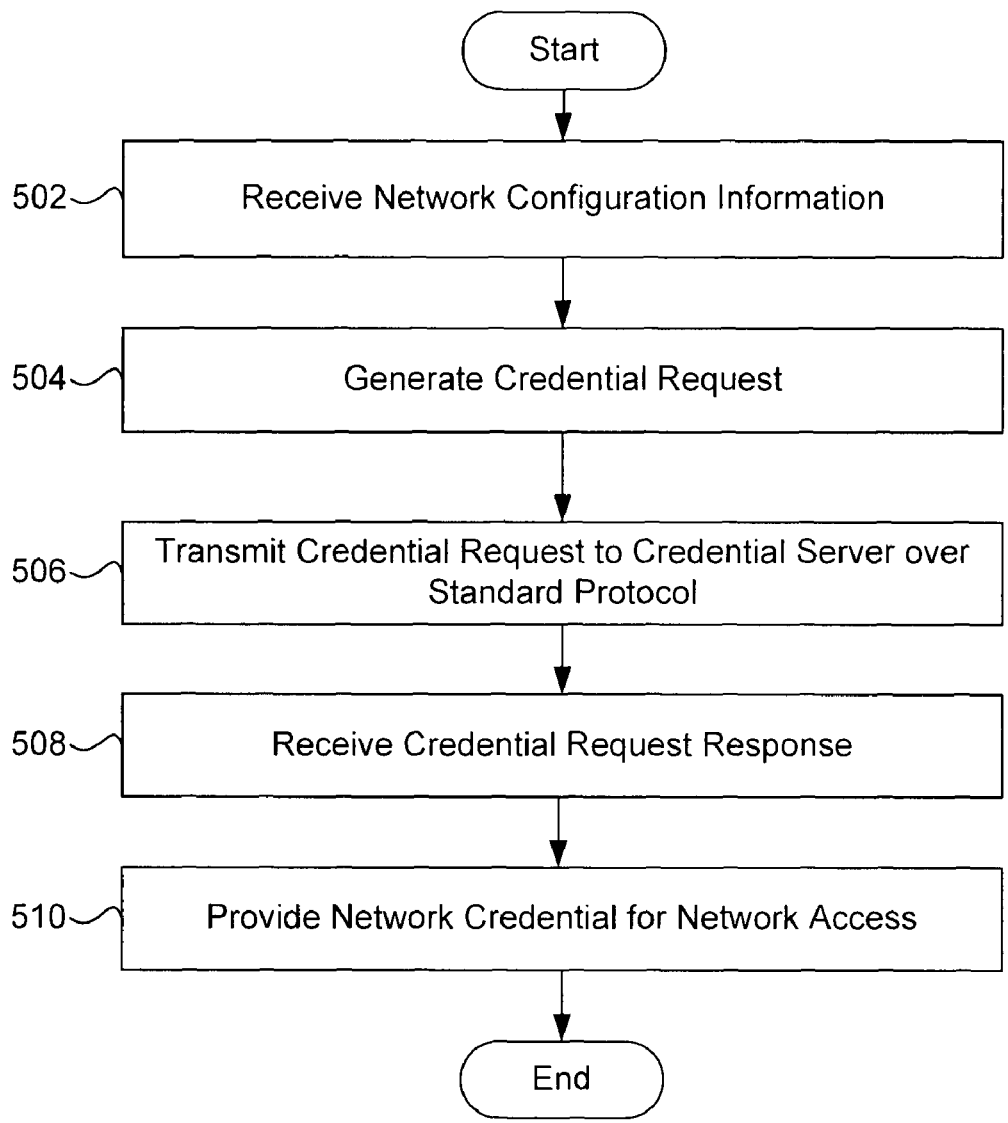
FIG. 5 is a flow diagram of the exemplary method for acquiring network credentials.

FIG. 5 is a flow diagram of the exemplary method for acquiring network credentials. In step 502, the digital device 102 receives network configuration information. In one example, the network module 202 searches and finds an available wireless network via the network device 104. The network module 202 negotiates a connection with the network device 104. During the negotiation, the network module 202 may receive network configuration information. Network configuration information may comprise an identifier for the network device 104 and the DNS server 110. In one example, the network module 202 receives a DNS server IP address (e.g., for the DNS server 110) during the negotiation. The network module 202 may also receive an identifier of the service provider associated with the authentication server 108 (e.g., T-mobile).

In step 504, the digital device 102 generates the credential request. In various embodiments, the credential request module 204 generates the credential request. The credential request may comprise a sequence identifier, DDID, and SSID. In various embodiments, the credential request module 204 generates a nonce and digitally signs the credential request with an encryption key.

In step 506, the digital device 102 transmits the credential request using a standard protocol. The network device 104 may receive and forward the credential request to the communication network 114. In various embodiments, the network device 104 may provide the credential request to the authentication server 108, the DNS server 110, or the access controller 112 which may forward the credential request.

The credential server 116 may receive the credential request. In various embodiments, the credential server 116 decrypts and authenticates the digital signature with an encryption key. The credential server 116 may then identify the proper network credentials based on the information contained within the credential request. The network credentials may be incorporated within a credential request response and transmitted back to the digital device 102.

In step 508, the digital device 102 receives the credential request response and retrieves the network credentials. In one example, the credential engine 206 receives and authenticates the credential request response. If the credential request response is authenticated, the network credentials are retrieved from the credential request response.

In step 510, the digital device 102 provides the network credential to the network device 104 to obtain network access to the communication network 114. In one example, the credential engine 206 retrieves one or more forms from the authentication server 108, populates the forms with one or more credentials, and provides the completed forms to the authentication server 108. In another example, the credential engine 206 provides the network credentials as needed to the authentication server 108. Once the network credentials are received by the authentication server 108, the authentication server 108 may allow communication between the digital device 102 and the communication network 114. In one example, the authentication server 108 commands the access controller 112 to allow the communication.

Figure 6:
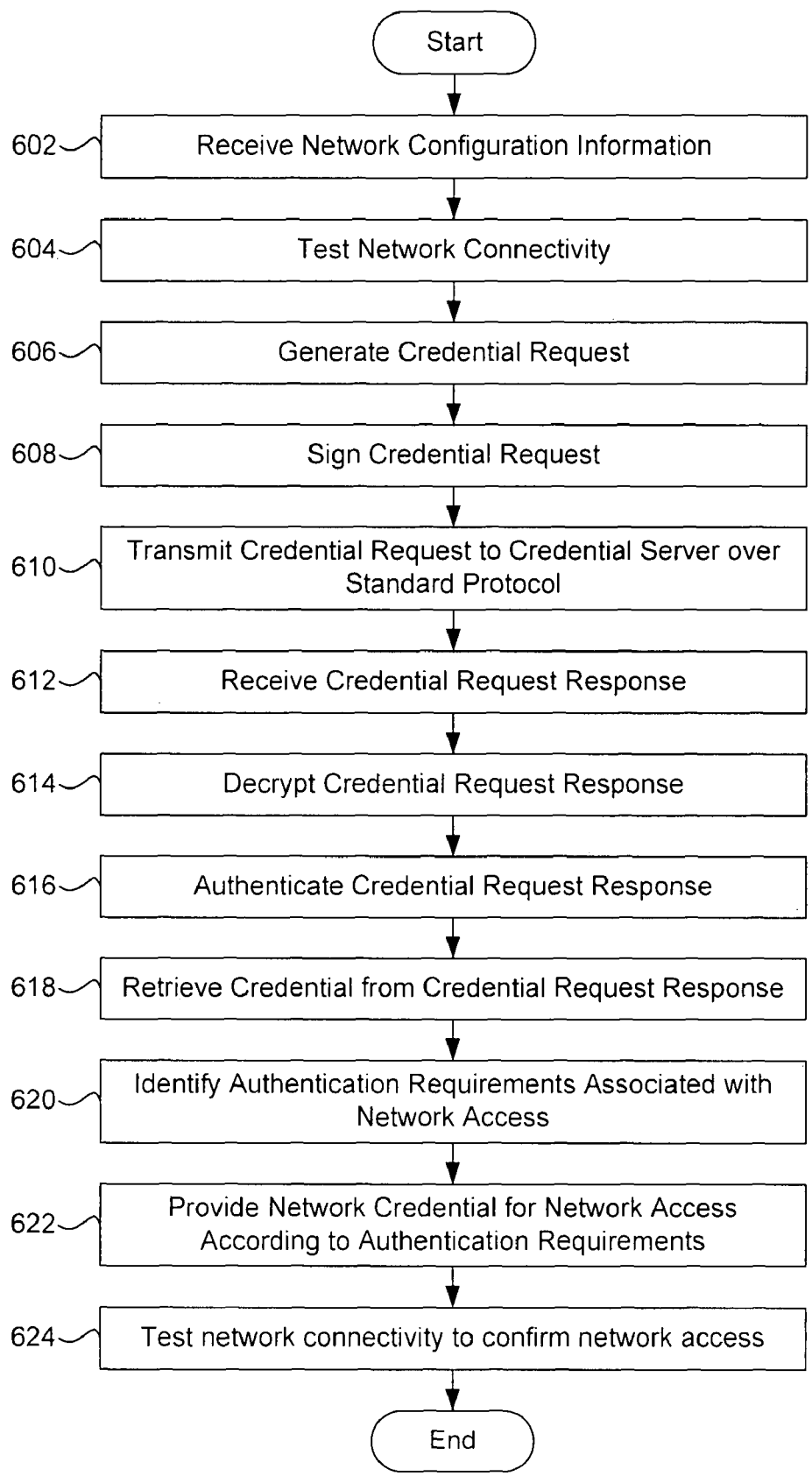
FIG. 6 is another flow diagram of the exemplary method for acquiring network credentials.

FIG. 6 is another flow diagram of the exemplary method for acquiring network credentials. In step 602, the digital device 102 receives the network configuration information. In step 604, the digital device 102 tests network connectivity. For example, once a connection has been negotiated through the network device 104, the network module 202 may attempt to connect to a web site. In response, the authentication server 108 or the access controller 112 may redirect the attempted connection to a network access page requesting network credentials. In various embodiments, the credential request module 204 may identify the service provider associated with the authentication server 108 through the network access page.

In step 606, the digital device 102 generates a credential request. In various embodiments, the credential request comprises a DDID that identifies the user associated with the digital device 102 and an SSID that identifies the network access point (e.g., the network device 104, the authentication server 108, or a service provider). The credential request may also comprise a sequence identifier and a version identifier.

In step 608, the digital device 102 digitally signs the credential request. In various embodiments, a nonce is generated and included within the digital signature. In one example, the credential request is encrypted with an encryption key (e.g., one of a key pair or an encryption key that is shared with the credential server 116).

In step 610, the digital device 102 transmits the credential request to the credential server 116 over a standard protocol. In one example, the credential request is transmitted to the DNS server 110 which was identified by a DNS server IP address received within the network configuration information. In some embodiments, the DNS server 110 treats the credential request as a locally unresolvable DNS request and forwards the credential request over the communication network 114 to another DNS server. Ultimately, the credential server 116 may receive the forwarded credential request.

The credential server 116 may authenticate the digital signature within the credential request and retrieve the nonce. The credential server 116 may then determine and retrieve the correct network credential from records contained within the credential server 116 using the DDID and SSID contained within the credential server 116. Subsequently, the credential server 116 generates a credential request response containing the nonce and the network credentials. The credential request response is encrypted using an encryption key (e.g., one encryption key of a key pair or a shared encryption key). In various embodiments, the encrypted credential request response includes the nonce received from the digital device 102 in the credential request. The credential request response is then transmitted back to the digital device 102.

The credential server 116 may store the sequence identifier. In various embodiments, the sequence identifier may be used to determine if the digital device 102 successfully acquired access to the communication network 114. Further, the credential request response may comprise a command to not cache the credential request response. In response to the command to not cache, intermediate DNS servers (i.e., DNS servers that relay the credential request response between the credential server 116 and the digital device 102) do not cache the credential request response. In some embodiments, in response to the command, the digital device 102 may not cache the credential request response or update the DNS library.

The process of the credential server 116 generating the credential request response is further discussed in co-pending U.S. patent application Ser. No. 11/899,638, entitled "Systems and Methods for Obtaining Network Access," filed Sep. 6, 2007.

In step 612, the digital device 102 receives the credential request response from the credential server 116. In step 614, the digital device 102 decrypts the credential request response. In one example, the digital device 102 decrypts the credential request response using an encryption key and retrieves the nonce from the credential request response.

In step 616, the digital device 102 authenticates the credential request response. In various embodiments, the digital device 102 determines the authenticity based on the successful decryption of the credential request response. In some embodiments, the nonce retrieved from the credential request response is compared to the nonce that was generated and included within the credential request to further authenticate the credential request response.

If the credential request response is authenticated, the digital device 102 retrieves the network credentials from the credential request response in step 618. In step 620, the digital device 102 identifies the authentication requirements associated with network access.

In various embodiments, the digital device 102 determines the correct information and network credentials to provide to the authentication server 108. In one example, the digital device 102 retrieves one or more network access pages from the authentication server 108. The digital device 102 may access the correct network access page from the authentication server and automatically make selections. In one example, the digital device 102 may automatically activate selections (e.g., activate buttons within the network access page, check boxes, and select radio buttons). Automatic selections may be based on selections by the credential engine. For example, the credential engine may access a form library (not depicted) which may identify the form(s) retrieved from the authentication server and provide executable instructions for the automatic selections. The credential engine may also activate selections based on instructions contained within the network credentials retrieved from the credential request response. Those skilled in the art will appreciate that there may be many methods with which selections may automatically be made.

In other embodiments, the digital device 102 determines the proper information to send to the authentication server 108 without first retrieving a network access page. The determination of proper information to send to the authentication server 108 may be based on instructions which identify the network device 104, the authentication server 108, or the service provider.

In step 622, the digital device 102 provides network credentials for network access according to the authentication requirements. In various embodiments, the digital device 102 provides a username, password, account number or the like from the network credentials to the authentication server 108. Once the authentication server 108 authenticates the digital device 102, the authentication server 108 may command the access controller 112 to allow communication access between the digital device 102 and the communication network 114.

In various embodiments, the network credentials comprise login procedure information that instructs the digital device 102 to simply activate an option within the network access page. In one example, a network access page may simply consist of terms and conditions of service. For the digital device 102 to obtain network access, a single selection within the network access page must be activated (such as a "submit" button or an indication that the user agrees to the terms and conditions). Pursuant, at least in part, to the login procedure information, the digital device 102 may automatically make the correct selection and obtain network access without providing any further credentials such as a password or username. It will be appreciated by those skilled in the art that one or more selections may be automatically made based on the login procedure information.

Further, any combination of one or more usernames, one or more passwords, and one or more login procedure information may be contained within the network credential. In some embodiments, the network credential may contain a username. In other embodiments, the network credential may contain a password.

In step 624, the digital device 102 tests network connectivity to confirm network access. In one example, the digital device 102 attempts to connect to a web site associated with the credential server 116 (e.g., the credential server 116 may function as a web server). In some embodiments, the query or command contains the sequence identifier previously submitted within the credential request. If network access is successful, the credential server 116 may receive the query or command and retrieve the sequence identifier. The credential server 116 may then confirm that network access was successful.

Figure 7:
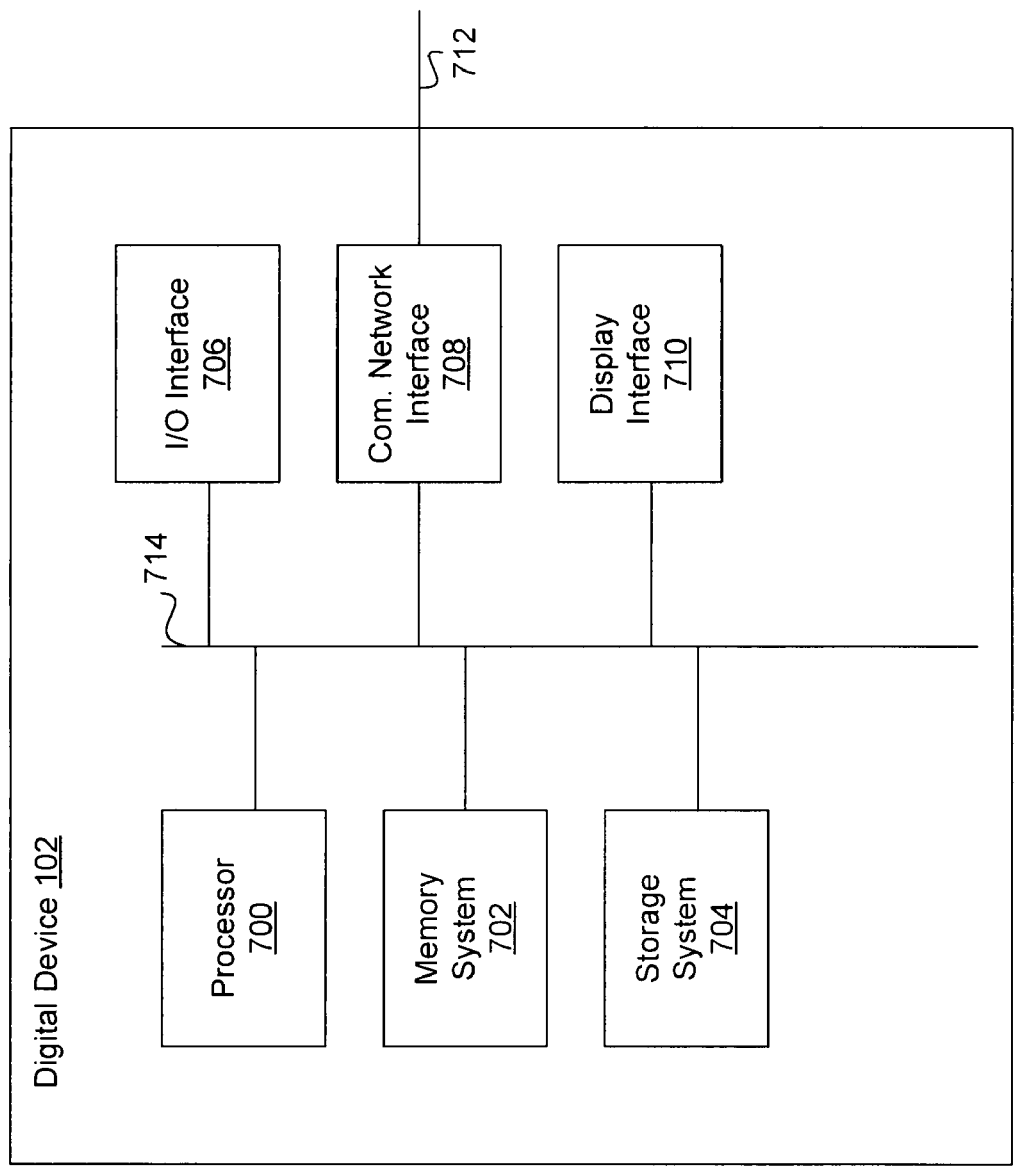
FIG. 7 is a block diagram of an exemplary digital device.

FIG. 7 is a block diagram of an exemplary digital device. The digital device 102 comprises a processor 700, a memory system 702, a storage system 704, an I/O interface 706, a communication network interface 708, and a display interface 710. The processor 700 is configured to execute executable instructions (e.g., programs). In some embodiments, the processor 700 comprises circuitry or any processor capable of processing the executable instructions.

The memory system 702 is any memory configured to store data. Some examples of the memory system 702 are storage devices, such as RAM or ROM. The memory system 702 can comprise the ram cache. In various embodiments, data is stored within the memory system 702. The data within the memory system 702 may be cleared or ultimately transferred to the storage system 704.

The storage system 704 is any storage configured to retrieve and store data. Some examples of the storage system 704 are flash drives, hard drives, optical drives, and/or magnetic tape. In some embodiments, the digital device 102 includes a memory system 702 in the form of RAM and a storage system 704 in the form of flash data. Both the memory system 702 and the storage system 704 comprise computer readable media which may store instructions or programs that are executable by a computer processor including the processor 700.

The optional input/output (I/O) interface 706 is any device that receives input from the user and output data. The optional display interface 710 is any device that is configured to output graphics and data to a display. In one example, the display interface 710 is a graphics adapter. It will be appreciated that not all digital devices 102 comprise either the I/O interface 806 or the display interface 810.

The communication network interface (com.network interface) 708 can be coupled to a network (e.g., the local area network 106 and communication network 114) via the link 712. The communication network interface 708 may support communication over an Ethernet connection, a serial connection, a parallel connection, or an ATA connection, for example. The communication network interface 708 may also support wireless communication (e.g., 802.11 a/b/g/n, WiMax). It will be apparent to those skilled in the art that the communication network interface 708 can support many wired and wireless standards.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for acquiring network credentials, the method comprising:

receiving, at a digital device, network configuration information from a network device on a communication network;

generating, by the digital device, a credential request, the credential request comprising an identifier associated with the network device;

transmitting, from the digital device, the credential request over the network device to a credential server using a DNS protocol;

receiving, at the digital device, a credential request response over the network device from the credential server; and providing, by the digital device, a network credential from the credential request response to the network device to access the communication network.

2. The method of claim 1, further comprising encrypting the credential request.

3. The method of claim 1, further comprising decrypting the credential request response.

4. The method of claim 1, further comprising digitally signing the credential request.

5. The method of claim 1, wherein the credential request comprises a location identifier.

6. The method of claim 5, wherein the location identifier is based on at least some of the network configuration information.

7. The method of claim 1, wherein the credential request response comprises a command to not cache the credential request response.

8. The method of claim 1, wherein providing the credential from the credential request response comprises analyzing a network access page and posting form information within the network access page.

9. The method of claim 1, wherein the credential request comprises a digital device identifier.

10. A digital device for acquiring network credentials, the digital device comprising:
    a processor;
    a network module configured to receive network configuration information from a network device on a communication network and transmit a credential request over the network device to a credential server using a DNS protocol;
    a credential request module configured to generate the credential request, the credential request comprising an identifier associated with the network device;
    a credential engine configured to receive a credential request response over the network device from the credential server; and
    a network access engine configured to provide a network credential from the credential request response to the network device to access the communication network.

11. The digital device of claim 10, further comprising an encryption/decryption module configured to encrypt the credential request.

12. The digital device of claim 10, further comprising an encryption/decryption module configured to decrypt the credential request response.

13. The digital device of claim 10, further comprising an encryption/decryption module configured to digitally sign the credential request.

14. The digital device of claim 10, wherein the credential request comprises a location identifier.

15. The digital device of claim 14, wherein the location identifier is based on at least some of the network configuration information.

16. The digital device of claim 10, wherein the credential request response comprises a command to not cache the credential request response.

17. The digital device of claim 10, wherein providing the credential from the credential request response comprises the network access engine configured to analyze a network access page and post form information within the network access page.

18. The digital device of claim 10, wherein the credential request comprises a digital device identifier.

19. A non-transitory computer readable medium having embodied thereon a program, the program being executable by a processor for performing a method for acquiring network credentials, the method comprising:
    receiving, at a digital device, network configuration information from a network device on a communication network;
    generating, at the digital device, a credential request, the credential request comprising an identifier associated with the network device;
    transmitting, from the digital device, the credential request over the network device to a credential server using a DNS protocol;
    receiving, by the digital device, the credential request response over the network device from the credential server; and
    providing, from the digital device, a network credential from the credential request response to the network device to access the communication network.

* * * * *